(12) United States Patent
Kumar et al.

(10) Patent No.: US 12,182,309 B2
(45) Date of Patent: Dec. 31, 2024

(54) METHOD AND SYSTEM FOR UNIFYING DE-IDENTIFIED DATA FROM MULTIPLE SOURCES

(71) Applicant: INNOVACCER INC., San Francisco, CA (US)

(72) Inventors: Prashant Kumar, Koderma (IN); Varun Jain, Bhiwani (IN); Mridul Saran, Bareilly (IN)

(73) Assignee: INNOVACCER INC., San Francisco, CA (US)

( * ) Notice: Subject to any disclaimer, the term of this patent is extended or adjusted under 35 U.S.C. 154(b) by 214 days.

(21) Appl. No.: 17/991,554

(22) Filed: Nov. 21, 2022

(65) Prior Publication Data

US 2023/0161907 A1    May 25, 2023

(30) Foreign Application Priority Data

Nov. 23, 2021   (IN) .............................. 202111054004

(51) Int. Cl.
*G06F 21/62*   (2013.01)
*H04L 9/32*    (2006.01)

(52) U.S. Cl.
CPC ........ *G06F 21/6254* (2013.01); *H04L 9/3213* (2013.01)

(58) Field of Classification Search
CPC .............. G06F 21/6254; H04L 9/3213; H04L 9/0861; H04L 63/0407
See application file for complete search history.

(56) References Cited

U.S. PATENT DOCUMENTS

| 6,408,294 B1 | 6/2002 | Getchius ........... G06F 16/24534 |
| 6,484,161 B1 | 11/2002 | Chipalkatti ............. G06Q 30/02 |
| 7,047,242 B1 | 5/2006 | Ponte ..................... G06Q 10/00 |

(Continued)

FOREIGN PATENT DOCUMENTS

| CN | 109508432 | 3/2019 | ........... G06F 16/955 |
| CN | 109871538 | 6/2019 | ............. G06F 17/27 |

(Continued)

OTHER PUBLICATIONS

EPO Supplementary Search Report issued in EP20754922.1, dated Oct. 4, 2022, 12 pgs.

(Continued)

*Primary Examiner* — Ellen Tran
(74) *Attorney, Agent, or Firm* — HAYES SOLOWAY P.C.

(57) ABSTRACT

A method and a system are disclosed for generating a global identifier for linking or unifying a plurality of de-identified customer data received from multiple source environments. The plurality of customer data is de-identified based on a master salt and a master token is generated. The master token is encrypted using a source-encryption key to generate a source token. The source token is also encrypted using a target-encryption key to generate a transfer token. At a central environment or a central storage unit, the transfer token is decrypted and the source token is obtained. Thereafter, source token is decrypted to obtain the master token. At the central storage unit, the master token is hashed with a target salt to generate the global identifier which is subsequently used to unify the plurality of de-identified customer data.

16 Claims, 4 Drawing Sheets

(56) References Cited

U.S. PATENT DOCUMENTS

| | | | |
|---|---|---|---|
| 7,611,466 B2 | 11/2009 | Chalana | A61B 8/0858 |
| 8,515,939 B2 | 8/2013 | Chen et al. | G06F 17/30 |
| 8,849,693 B1 | 9/2014 | Koyfman | G06Q 30/02 |
| 8,977,953 B1 | 3/2015 | Pierre | G06F 40/284 |
| 9,292,707 B1* | 3/2016 | Fontecchio | H04L 9/0825 |
| 9,355,273 B2 | 5/2016 | Stevens | G06F 21/00 |
| 9,542,393 B2 | 1/2017 | Morton | G06F 16/7844 |
| 9,633,404 B2 | 4/2017 | Chawla et al. | G06F 7/04 |
| 9,727,591 B1 | 8/2017 | Sharma | G06F 16/215 |
| 9,830,476 B2 | 11/2017 | Fontecchio | H04L 9/32 |
| 10,056,078 B1 | 8/2018 | Shepherd | G06F 16/632 |
| 10,147,504 B1 | 12/2018 | Stettin et al. | G16H 50/30 |
| 10,366,346 B2 | 7/2019 | Achin et al. | G06F 15/18 |
| 10,642,648 B2 | 5/2020 | Ling et al. | G06F 9/48 |
| 10,691,976 B2 | 6/2020 | Rogers et al. | G06K 9/62 |
| 10,789,373 B2 | 9/2020 | Reid et al. | G06F 21/60 |
| 10,810,223 B2 | 10/2020 | Sundararaman et al. | G06F 16/254 |
| 10,885,759 B1 | 1/2021 | Lee et al. | G08B 25/10 |
| 10,887,202 B2 | 1/2021 | Hutchison et al. | H04L 12/26 |
| 10,910,089 B2 | 2/2021 | Austin et al. | G06F 21/62 |
| 10,983,843 B2 | 4/2021 | Duggal et al. | G06F 9/54 |
| 11,474,836 B2 | 10/2022 | Awadallah et al. | G06F 9/448 |
| 2003/0018633 A1 | 1/2003 | Horn | G06F 17/18 |
| 2004/0215629 A1 | 10/2004 | Dettinger | G06F 16/2452 |
| 2005/0065956 A1 | 3/2005 | Brown | G06F 16/252 |
| 2005/0107902 A1 | 5/2005 | Blouin | G06Q 10/087 |
| 2005/0119534 A1 | 6/2005 | Trost | G06F 19/00 |
| 2005/0131778 A1 | 6/2005 | Bennett | G06Q 10/0875 |
| 2006/0041539 A1 | 2/2006 | Matchett | G06Q 10/0639 |
| 2006/0075001 A1 | 4/2006 | Canning | G06F 8/65 |
| 2007/0239724 A1 | 10/2007 | Ramer | G06F 16/951 |
| 2008/0147554 A1 | 6/2008 | Stevens et al. | H04L 9/00 |
| 2009/0112114 A1 | 4/2009 | Ayyagari et al. | A61B 5/08 |
| 2009/0313232 A1 | 12/2009 | Tinsley | G06Q 30/02 |
| 2010/0121879 A1 | 5/2010 | Greenberg | G06F 16/248 |
| 2010/0199169 A1 | 8/2010 | Gnech | G06F 16/972 |
| 2010/0287162 A1 | 11/2010 | Shirwadkar | G06F 16/3338 |
| 2012/0253793 A1 | 10/2012 | Ghannam | G06F 17/27 |
| 2013/0197936 A1 | 8/2013 | Willlich | G06Q 50/22 |
| 2013/0325805 A1* | 12/2013 | Tochilnik | G06F 21/6254 707/E17.014 |
| 2014/0006061 A1 | 1/2014 | Watanabe | G06Q 30/02 |
| 2014/0149446 A1 | 5/2014 | Kuchmann-Beauger | G06F 17/30389 |
| 2014/0188835 A1 | 7/2014 | Zhang | G06F 17/2705 |
| 2014/0344261 A1 | 11/2014 | Navta | G06F 16/951 |
| 2015/0088786 A1 | 3/2015 | Anandhakrishnan | G06N 99/00 |
| 2015/0127379 A1 | 5/2015 | Sorenson | G06F 19/00 |
| 2015/0142807 A1 | 5/2015 | Hoffman et al. | G06N 3/02 |
| 2015/0164430 A1 | 6/2015 | Hu | A61B 5/7264 |
| 2015/0363478 A1 | 12/2015 | Haynes | G06F 16/26 |
| 2016/0085915 A1 | 3/2016 | Seow | G06F 19/00 |
| 2016/0098387 A1 | 4/2016 | Bruno | G06F 17/27 |
| 2016/0147945 A1 | 5/2016 | MacCarthy et al. | G06F 19/00 |
| 2016/0156611 A1 | 6/2016 | Rozman | H04L 29/06 |
| 2016/0162473 A1 | 6/2016 | Cogley | G06F 40/51 |
| 2016/0371453 A1 | 12/2016 | Bowman | G06F 19/00 |
| 2016/0373456 A1 | 12/2016 | Vermeulen | G06F 16/25 |
| 2017/0091162 A1 | 3/2017 | Emanuel | G06F 40/169 |
| 2017/0102693 A1 | 4/2017 | Kidd | G05B 19/41865 |
| 2017/0161372 A1 | 6/2017 | Fernandez | G06F 16/35 |
| 2017/0199928 A1 | 7/2017 | Zhao | G06F 16/24578 |
| 2017/0256173 A1 | 9/2017 | Burford | G09B 5/125 |
| 2017/0279786 A1 | 9/2017 | Peterson et al. | H04L 29/06 |
| 2017/0323485 A1 | 11/2017 | Samec et al. | G06T 19/00 |
| 2017/0337326 A1 | 11/2017 | Zhang et al. | G06F 19/24 |
| 2017/0344646 A1 | 11/2017 | Antonopoulos | H04L 9/008 |
| 2017/0364637 A1 | 12/2017 | Kshepakaran et al. | G06F 19/00 |
| 2017/0371881 A1 | 12/2017 | Reynolds | G06F 16/248 |
| 2018/0025122 A1 | 1/2018 | Schuurkamp et al. | G06F 19/00 |
| 2018/0033279 A1 | 1/2018 | Chong et al. | G08B 21/0453 |
| 2018/0052842 A1 | 2/2018 | Hewavitharana et al. | G06F 17/3043 |
| 2018/0113986 A1 | 4/2018 | Zhu | G06F 19/3418 |
| 2018/0158146 A1 | 6/2018 | Turner | G06Q 40/02 |
| 2018/0158551 A1 | 6/2018 | Bradley et al. | G16H 40/67 |
| 2018/0168464 A1 | 6/2018 | Barnett, Jr. et al. | A61B 5/0205 |
| 2018/0173733 A1 | 6/2018 | Nath et al. | G06F 17/30 |
| 2018/0210925 A1 | 7/2018 | Raghavan et al. | G06F 17/30 |
| 2018/0225320 A1 | 8/2018 | Saini | G06F 16/215 |
| 2018/0232443 A1 | 8/2018 | Delgo | G06Q 30/06 |
| 2018/0367557 A1 | 12/2018 | Brown | H04L 63/1425 |
| 2019/0012390 A1 | 1/2019 | Nishant | G06N 20/00 |
| 2019/0013093 A1 | 1/2019 | Slepian et al. | G16H 40/20 |
| 2019/0050445 A1 | 2/2019 | Griffith | G06K 9/6262 |
| 2019/0114511 A1 | 4/2019 | Gao et al. | G06K 9/62 |
| 2019/0156198 A1 | 5/2019 | Mars | G06N 20/20 |
| 2019/0179820 A1 | 6/2019 | El Kaed | G06F 16/2471 |
| 2019/0180757 A1 | 6/2019 | Kothari | G10L 17/005 |
| 2019/0259108 A1 | 8/2019 | Bongartz et al. | G06Q 50/02 |
| 2019/0304582 A1 | 10/2019 | Blumenthal et al. | G16H 15/00 |
| 2019/0318272 A1 | 10/2019 | Sassin | G06N 99/005 |
| 2019/0324964 A1 | 10/2019 | Shiran | G06N 20/00 |
| 2020/0004749 A1 | 1/2020 | Slezak | G06F 16/2462 |
| 2020/0067789 A1 | 2/2020 | Khuti et al. | H04L 41/16 |
| 2020/0074461 A1 | 3/2020 | DeRosa-Grund | G06Q 20/38 |
| 2020/0092099 A1* | 3/2020 | Austin | H04L 9/3239 |
| 2020/0117434 A1 | 4/2020 | Biskup et al. | G06F 8/60 |
| 2020/0160955 A1 | 5/2020 | Hansen et al. | G16H 15/00 |
| 2020/0211692 A1 | 7/2020 | Kalafut et al. | G16H 30/20 |
| 2020/0257611 A1 | 8/2020 | Hortala et al. | G06F 11/36 |
| 2020/0387623 A1* | 12/2020 | Bayon | H04L 9/3242 |
| 2021/0090694 A1 | 3/2021 | Colley et al. | G16H 10/60 |
| 2021/0287656 A1 | 9/2021 | Bonafonte et al. | G10L 13/10 |
| 2021/0319796 A1 | 10/2021 | Wang et al. | G10L 15/26 |
| 2022/0004443 A1 | 1/2022 | Duggal et al. | G06F 9/54 |

FOREIGN PATENT DOCUMENTS

| | | | |
|---|---|---|---|
| CN | 110245676 | 9/2019 | G06K 9/62 |
| CN | 110998532 | 4/2020 | G06F 9/50 |
| CN | 112262368 | 1/2021 | G06F 8/30 |
| JP | 2004-318565 | 11/2004 | G06F 17/60 |
| KR | 10-1999152 | 7/2019 | G06F 17/27 |
| WO | WO 2012/023136 | 2/2012 | G01N 7/00 |
| WO | WO 2012/051389 | 4/2012 | G06F 7/00 |
| WO | WO 2017/161403 | 9/2017 | G06Q 30/02 |
| WO | WO 2018/057647 | 3/2018 | C12Q 1/68 |
| WO | WO 2018/166853 | 9/2018 | G16H 10/60 |
| WO | WO 2020/219971 | 10/2020 | G06N 3/04 |
| WO | WO 2021/036070 | 3/2021 | G06F 16/22 |

OTHER PUBLICATIONS

International Search Report and Written Opinion issued in PCT/US2020/13802 dated Mar. 25, 2020 (10 pgs).

International Search Report and Written Opinion issued in PCT/US2020/16827 dated Apr. 22, 2020 (7 pgs).

International Search Report and Written Opinion issued in PCT/US2022/045784, dated Feb. 8, 2023, 10 pgs.

International Preliminary Report on Patentability issued in PCT/US2020/013802, dated Aug. 10, 2021, 7 pgs.

International Preliminary Report on Patentability issued in PCT/US2020/016827, dated Aug. 10, 2021, 5 pgs.

Notice of Allowance issued in U.S. Appl. No. 16/387,016, dated Feb. 10, 2020 (14 pgs).

Notice of Allowance issued in U.S. Appl. No. 16/363,897, dated Jul. 30, 2020 (18 pgs).

Notice of Allowance issued in U.S. Appl. No. 16/743,175, dated Jul. 31, 2020 (18 pgs).

Office Action issued in U.S. Appl. No. 16/387,016, dated Jun. 25, 2019 (11 pgs).

Office Action issued in U.S. Appl. No. 16/387,016, dated Oct. 17, 2019 (17 pgs).

Office Action issued in U.S. Appl. No. 16/363,897, dated Sep. 9, 2019 (38 pgs).

(56) References Cited

OTHER PUBLICATIONS

Office Action issued in U.S. Appl. No. 16/363,897, dated Feb. 26, 2020 (36 pgs).
Office Action issued in U.S. Appl. No. 16/743,175 dated Mar. 23, 2020 (21 pgs).
Office Action issued in India Application No. 201921043365, dated Dec. 10, 2021, 7 pgs.
Datavant—Connecting the world's health data, slide presentation, https://www.healthra.org/wp-content/uploads/2018/10/Datavant-Overivew-Deck Prepared-for-HRA_v20181002-1.pdf Oct. 2018, 15 pgs.
"De-identification and re-identification of PII in large-scale datasets using Cloud DLP", Cloud Architecture Center, https://cloud.google.com/architecture/de-identification-re-identification-pii-using-cloud-dlp, Aug. 11, 2022, 9 pgs.
Morid et al. "Supervised Learning Methods for Predicting Healthcare Costs: Systematic Literature Review and Empirical Evaluation", 2018, AMIA Annu Symp Proc. pp. 1312-1321.
Shin, "Encoding Database Schemas with Relation-Aware Self-Attention for Text-to-SQL Parsers", arXiv: 1906.11790v1 [cs.LG] Jun. 27, 2019, 10 pgs.
Suleiman et al., "Deep Learning Based Abstractive Text Summarization: Approaches, Datasets, Evaluation Measures, and Challenges", Hindawi, Mathematical Problems in Engineering, vol. 2020, Article ID 9365340, Aug. 24, 2020, 29 pgs.
Wang et al. "Detecting Transportation Modes Based on LightBGM Classifier from GPS Trajectory Data", 2018 26th International Conference on Geoinformatics, Kunming, 2018, pp. 1-7.
Zhang et al. "Health reform and out-of-pocket payments: lessens from China", Health Policy and Planning, vol. 29, Issue 2, Mar. 2014, pp. 217-226, https://doi.org/10.1093/heapol/czt006.
Iyengar et al. "A Trusted Healthcare Data Analytics Cloud Platform", 2018 IEEE 38th International Conference on Distributed Computing Systems (ICDCS), Vienna, 2018, pp. 1238-1249.
Arjona et al. "Triggerflow: Trigger-based orchestration of serverless workflows", Future Generation Computer Systems 124, 2021, pp. 215-229.
Carver et al. "In Search of a Fast and Efficient Serverless DAG Engine", George Mason University, Nov. 18, 2019, 10 pgs.
International Search Report and Written Opinion issued in PCT/US2023/021014, dated Jul. 28, 2023, 9 pgs.
"Artificial Intelligence for the Data-Driven Enterprise" *Informatica*, informatica.com, 2023, 36 pages.
Gill, Navdeep Singh "Big Data Ingestion Tools and its Architecture | The Advanced Guide" Xenonstack A Stack Innovator, Apr. 29, 2023, https://www.xenonstack.com/blog/big-data-ingestion, 16 pages.
He et al., "The practical implementation of artificial intelligence technologies in medicine" *Nat Med*, Jan. 2019; 25(1):30-36, 15 pages.
Kaur et al., "AI based HealthCare Platform for Real Time, Predictive and Prescriptive Analytics using Reactive Programming" *Journal of Physics: Conference Series* 933 (2018), 13 pages.
Krugman, Brandon, "Converting Medical Service Provider Data into a Unified Format for Processing" (2015).*Master's Theses* (2009 -). Paper 322. http://epublications.marquette.edu/theses_open/322, 50 pages.
International Search Report and Written Opinion issued in PCT/US2023/025897, dated Sep. 21, 2023, 10 pgs.
International Search Report and Written Opinion issued in PCT/US2022/050117 dated Mar. 3, 2023 (8 pgs).
International Search Report and Written Opinion issued in PCT/US2022/050616 dated Mar. 27, 2023 (7 pgs).
U.S. Appl. No. 17/960,565, filed Oct. 5, 2022, Kittel.
U.S. Appl. No. 17/988,505, filed Nov. 16, 2022, Gupta et al..
U.S. Appl. No. 18/143,397, filed May 4, 2023, Gupta et al..
U.S. Appl. No. 18/212,562, filed Jun. 21, 2023, Singh.
U.S. Appl. No. 18/420,434, filed Jan. 23, 2024, Raghuvansh et al..
Office Action issued in U.S. Appl. No. 17/960,565, dated Aug. 22, 2024, 17 pgs.

\* cited by examiner

METHOD AND SYSTEM FOR UNIFYING DE-IDENTIFIED DATA FROM MULTIPLE SOURCES

CROSS REFERENCE TO RELATED APPLICATION

This application claims benefit of Indian Application Serial No. 202111054004 filed Nov. 23, 2021, the entire disclosure of which is incorporated herein by reference.

TECHNICAL FIELD

The present subject matter relates to data analytics, and more particularly to methods and systems for providing a global identifier for unifying de-identified data received from multiple sources.

BACKGROUND

Various business sectors perform data analytics for the purpose of improvement and better management. The data being generated, transacted, or stored during a business process also carry sensitive information. In order to perform data analytics, it is often required to move the data from a source environment to one target environment or a central environment. In other words, the data is aggregated to a central environment for the purpose of analysis on a larger set of data. While moving the data to a central environment, the sensitive information of the data must be protected from getting mishandled and any unauthorized access of data must also be avoided. In some sectors, government regulatory organizations are set up to provide strict norms and standards to protect identity information of the customers associated with a business sector or organization. For example, analytics on healthcare data help to assess problems in a particular treatment process or to identify steps for improvisation, and accordingly the analytics on healthcare data must be performed only when sensitive information, such as Personal Identifiable Information (PII) or Personal Health Information (PHI) of a patient is protected when moving the data between the environments as per the standards and protocols required by medical regulatory authorities.

The personal identity information of customers may include their name, unique identification number issued to health care providers (for example, National Provider Identifier or NPI), identification number, account number etcetera. Such identity information is generally associated with any data as unique identifiers which remains unique at the different data sources located at different geographical locations. The various identifiers associated with respective data are de-identified before carrying out any data processing or analytics that is external to that organization or environment. The de-identification process has to be carried out to hide the personal identity information of a customer, user or organization.

The de-identification process is an encryption process that may be performed by using hash keys at the customer end before the data is moved to another environment or central environment. Although the de-identification process encrypts the data along with its associated identifier, a de-identified data at the customer end or at the source environment is often prone to dictionary attacks by unauthorized entities. Further, if the salt used to hash (or encryption keys used to encrypt) gets leaked, the entire de-identified data will be at risk and pose a single point of failure. The unauthorized entities may attempt to obtain the key to decrypt the customer information. Further, for performing analytics, data from multiple sources are de-identified and merged together. Some of the data coming from different sources may have common identifiers which may be hidden or de-identified when moved to a target environment. Therefore, at the target environment, it becomes difficult to identify and link the data which have same identifiers.

In view of the above limitations, a heretofore unaddressed need exists in the industry to address the aforementioned deficiencies and inadequacies.

SUMMARY

In order to provide a holistic solution to the above-mentioned limitations, it is necessary to unify de-identified data received from multiple sources.

An object of the present subject matter is to facilitate de-identification of identifiers associated with multiple data across multiple sources.

An object of the present subject matter is to de-identify the identifiers such that the universal identifiers associated with multiple data, remain unique after de-identification.

Another object of the present subject matter is to transfer the de-identified data to a central environment through a secure channel.

Yet another object of the present subject matter is to prevent unauthorized linking of de-identified data.

Yet another object of the present subject matter is to facilitate a 'No single point of failure'.

Yet another object of the present subject matter is to eliminate redundant computation during de-identification execution for making the overall solution time and space efficient.

Yet another object of the present subject matter is to enable analytics on de-identified data linked from multiple sources while still hiding the identity of sensitive data.

According to an embodiment of the present subject matter, there is provided a method for unifying a plurality of de-identified customer data from one or more source storage units. The method comprises: accessing, via the one or more source storage units over a communication network, a plurality of customer data; configuring a source processing unit, the source processing unit being in communication to the one or more source storage units and a source server, the source processing unit is configured for: de-identifying the plurality of customer data based on a master salt to generate a master token; encrypting the master token using a source-encryption key to generate a source token; encrypting the source token using a target-encryption key to generate a transfer token; allowing an authorized access of the transfer token via a secured channel at a central storage unit; configuring a central processing unit, the central processing unit being in communication to the central storage unit and a central server, the central processing unit is configured for: decrypting the transfer token using a target decryption key to obtain the source token; decrypting the source token using a source decryption key to obtain the master token; hashing the master token with a target salt to generate a global identifier; and unifying the plurality of de-identified customer data by using the global identifier.

According to an embodiment of the present subject matter, each of the plurality of customer data is associated with a corresponding identifier containing person identity information (PII) and non-PII information of respective customers.

According to another embodiment of the present subject matter, the first salt generates same master token at the one or more source storage units for any of the corresponding identifiers.

According to yet another embodiment of the present subject matter, the first salt is a randomly generated multi-digit alphanumeric code.

According to yet another embodiment of the present subject matter, the target salt is a randomly generated multi-digit alphanumeric code.

According to yet another embodiment of the present subject matter, the source-encryption key is a private key to encrypt the master token.

According to yet another embodiment of the present subject matter, the target encryption key is a public key to encrypt the source token.

According to yet another embodiment of the present subject matter, the source token is used by an authorized user to link respective customer data by accessing the source decryption key.

According to an embodiment of the present subject matter, a system for unifying a plurality of de-identified customer data from one or more source storage units is provided. The system comprises: one or more source storage units storing a plurality of customer data; a source processing unit connected in communication to the one or more source storage units and a source server in a communication network, the source processing unit is configured for: de-identifying the plurality of customer data based on a master salt to generate a master token; encrypting the master token using a source-encryption key to generate a source token; encrypting the source token using a target-encryption key to generate a transfer token; allowing an authorized access of the transfer token via a secured channel at a central storage unit; a central processing unit connected in communication to the central storage unit and a central server in the communication network, the central processing unit is configured for: decrypting the transfer token using a target decryption key to obtain the source token; decrypting the source token using a source decryption key to obtain the master token; hashing the master token with a target salt to generate a global identifier; and unifying the plurality of de-identified customer data by using the global identifier.

The afore-mentioned objectives and additional aspects of the embodiments herein will be better understood when read in conjunction with the following description and accompanying drawings. It should be understood, however, that the following descriptions, while indicating preferred embodiments and numerous specific details thereof, are given by way of illustration and not of limitation. This section is intended only to introduce certain objects and aspects of the present invention, and is therefore, not intended to define key features or scope of the subject matter of the present invention.

BRIEF DESCRIPTION OF THE DRAWINGS

The figures mentioned in this section are intended to disclose exemplary embodiments of the claimed system and method. Further, the components/modules and steps of a process are assigned reference numerals that are used throughout the description to indicate the respective components and steps. Other objects, features, and advantages of the present invention will be apparent from the following description when read with reference to the accompanying drawings:

Like reference numerals refer to like parts throughout the description of several views of the drawings.

DETAILED DESCRIPTION

Figure 1:
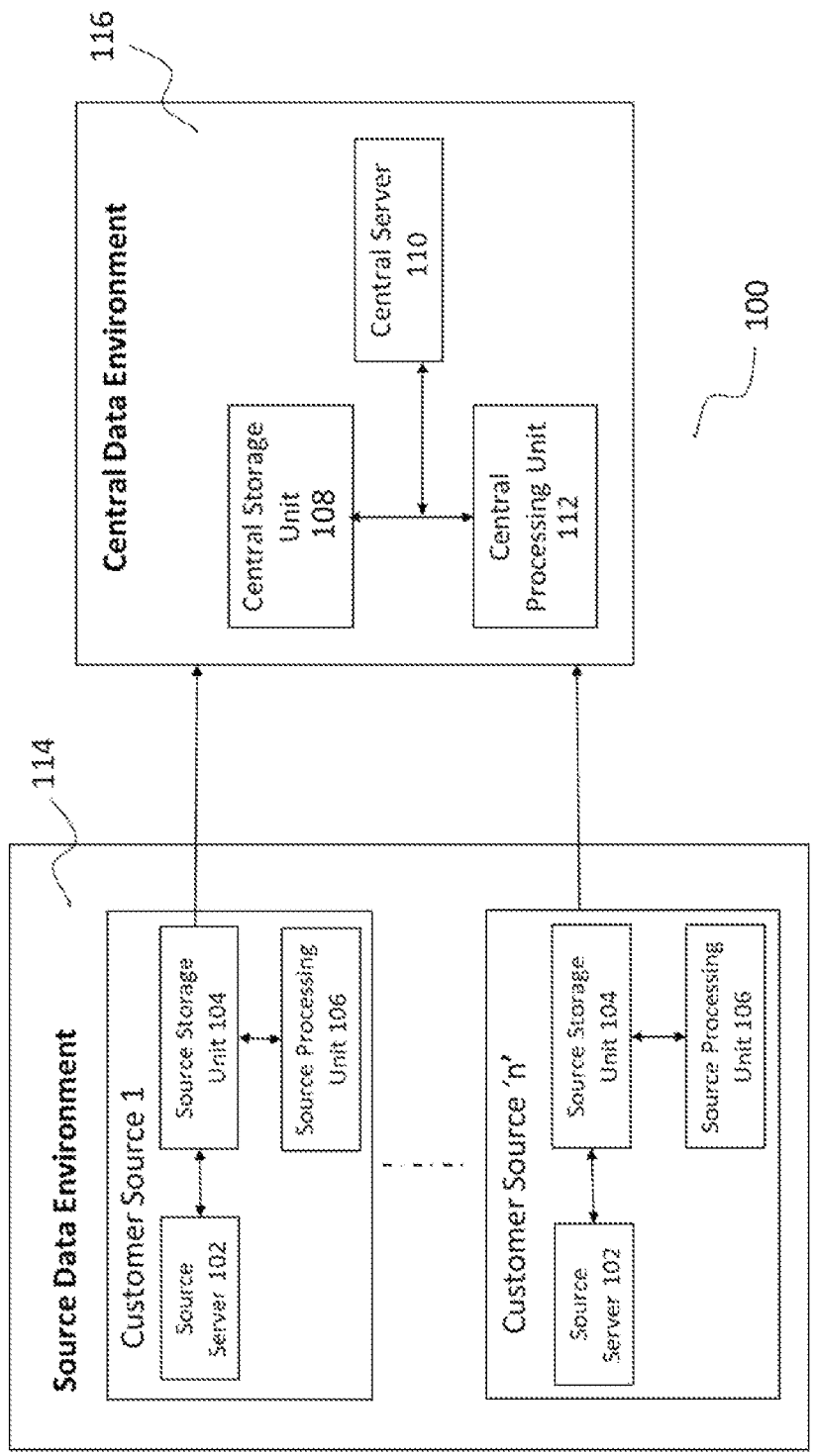
FIG. 1 illustrates system architecture, according to an exemplary embodiment of the present subject matter.

This section is intended to provide explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

The specification may refer to "an", "one", "different" or "some" embodiment(s) in several locations. This does not necessarily imply that each such reference is to the same embodiment(s), or that the feature only applies to a single embodiment. Single features of different embodiments may also be combined to provide other embodiments.

Embodiments of the present subject matter discloses an optimized, deterministic, and secure mechanism to link de-identified universal attributes. Accordingly, a method and a system are provided for generating a global identifier for linking a plurality of de-identified customer data received from multiple source environments or customer environments. A plurality of customer data is de-identified based on a master salt and thereafter a master token is generated. The master token is used to generate a source token which is encrypted to generate a transfer token. At a central environment, the transfer token is decrypted to obtain the source token. Thereafter, source token is decrypted to obtain the master token. At the central server, the master token is hashed with a target salt to generate the global identifier. At the central environment, the global identifier facilitates to link the de-identified data coming from the multiple source environments.

As used herein, 'processing unit' is an intelligent device or module, that is capable of processing digital logics and also possesses analytical skills for analyzing and processing various data or information, according to the embodiments of the present subject matter.

As used herein, 'storage unit' refers to a local or remote memory device; docket systems; databases; each capable to store information including, data files, Person Identification Information (PII), Personal/Protected Health Information (PHI), metadata, transaction details, location details, GPS data, and encryption protocol information. In an embodiment, the storage unit may be a database server, a cloud storage, a remote database, a local database.

As used herein, 'user device' is a smart electronic device capable of communicating with various other electronic devices and applications via one or more communication networks. Examples of said user device include, but not limited to, a wireless communication device, a smart phone, a tablet, a desktop, a laptop, etcetera. The user device comprises: an input unit to receive one or more input data; an operating system to enable the user device to operate; a processor to process various data and information; a memory unit to store initial data, intermediary data and final data; and an output unit having a graphical user interface (GUI).

As used herein, 'module' or 'unit' refers to a device, a system, a hardware, a computer application configured to execute specific functions or instructions according to the embodiments of the present invention. The module or unit may include a single device or multiple devices configured to perform specific functions according to the present invention disclosed herein.

As used herein, 'communication network' includes a local area network (LAN), a wide area network (WAN), a metropolitan area network (MAN), a virtual private network (VPN), an enterprise private network (EPN), the Internet, and a global area network (GAN).

Terms such as 'connect', 'integrate', 'configure', and other similar terms include a physical connection, a wireless connection, a logical connection or a combination of such connections including electrical, optical, RF, infrared, or other transmission media, and include configuration of software applications to execute computer program instructions, as specific to the presently disclosed embodiments, or as may be obvious to a person skilled in the art.

Terms such as 'send', 'transfer', 'transmit' and 'receive', 'collect', 'obtain', 'access' and other similar terms refers to transmission of data between various modules and units via wired or wireless connections across a communication network.

FIG. 1 illustrates architecture of a system 100 for unifying a plurality of de-identified customer data from one or more source storage units, according to an exemplary embodiment of the present subject matter. The system 100 according to the present subject matter comprises a plurality of components. For example, and by no way limiting the scope of the present subject matter, the system 100 comprises a central environment 116 receiving a plurality of customer data from multiple source environments (customer environments) 114. Each of the source environments comprises a source server 102, at least one source storage unit 104, and at least one source processing unit 106. The central environment 116 comprises a central storage unit 108, a central processing unit 112, and a central server 110. Each of the source server 102 and the central server 110 comprises a separate key management unit (not shown in the Figure) for providing necessary encryption and decryption keys.

The at least one Source Storage Unit 104, the at least one source processing unit 106, the source server 102 constitute a source data environment, whereas the central storage unit 108, the central processing unit 112, and the central server 110 constitute a central environment or central data environment 116. The central data environment 116 may also be termed as target environment or global data lake. The source data environment 114 may include the at least one source storage unit 104 communicatively connected to at least one source processing unit 106. The source server 102 may also be communicatively connected to the at least one source storage unit 104 and the at least one source processing unit 106 for enabling various encryptions and data transactions within the source data environment 114. Similarly, the central data environment 116 may include the at least one central storage unit 108 communicatively connected to the at least one central processing unit 112. The central server 110 may also be communicatively connected to the at least one central storage unit 108 and the at least one central processing unit 112 for enabling various decryptions and data transactions within the central data environment 114 The source data environment 114 and the central data environment 116 may be communicatively connected to each other via a communication network.

The source storage unit 104 may include one or more databases for accommodating data of one or more organizations, companies, institutions and individuals, hereinafter termed as 'customer(s)'. The source database contains a plurality of customer data which are required to be de-identified before being moved to the central environment in order to perform analytics on a larger set of data, for example, to calculate benchmarks (cost, quality, risk, utilisation) aggregating data from multiple sources (customers) to give a more realistic picture. The source database may encompass multiple source data environments or customer environments pertaining to various sectors, such as the healthcare sector, which need to comply with strict laws around data sharing and privacy. In the healthcare sector, large longitudinal datasets may be required to be built for training machine learning and deep learning models in order to be able to predict better healthcare outcomes. Pharma and life science companies also need to run clinical trials on de-identified data Accordingly, the embodiments of the present subject matter, provides the system 100 that uses a combination of masking, hashing, and encryption to perform a de-identification process. The de-identification process hides or de-identifies its identity information as may be required by the authorized regulatory organizations. The de-identified customer data is then transferred to the target environment through a secure channel for protecting the data in third. Further, each of the plurality of customer data is associated with an identifier. An identifier contains identity information (ID) of respective customers. The identifiers associated with any customer data may therefore include person identifiable information (PII) containing person/organisation entities with other non PII entities. The de-identification process is carried out to hide or mask the associated identifiers of the plurality of data by encrypting the data. Also, there may be different customer data having same identifier, and these different customer data may be residing at different databases at different geographical locations. For example, 'Customer Data 1' with 'Identifier 1', may be stored at location A. Another data, 'Customer Data 2' associated with same identifier 'Identifier 1 may be stored at location B. The Customer Data 1 and Customer Data 2 may be de-identified and moved to a target location. According to the embodiments of present subject matter, such data having same identifiers are de-identified by maintaining uniqueness of the identifiers across all the sources even after de-identification. Therefore, both 'Customer Data 1' and 'Customer Data 2' that are associated with 'Identifier 1', will be identified as data having identical identifiers that can be linked together at the target environment. Thus, at the target location, linking process of customer data having universal attributes may be facilitated according to the embodiments disclosed herein. Any un-authorized linking is also prevented at the target location. Further, a caching mechanism may be used to eliminate any redundant computation during de-identification execution, thereby making the overall solution time and space efficient. According to the embodiment of the present subject matter, the de-identified data is hashed and encrypted at multiple sources by multiple parties. Therefore, there is no 'single point of failure' and the de-identified data will be available at other points in case any of the points fails.

Figure 2:
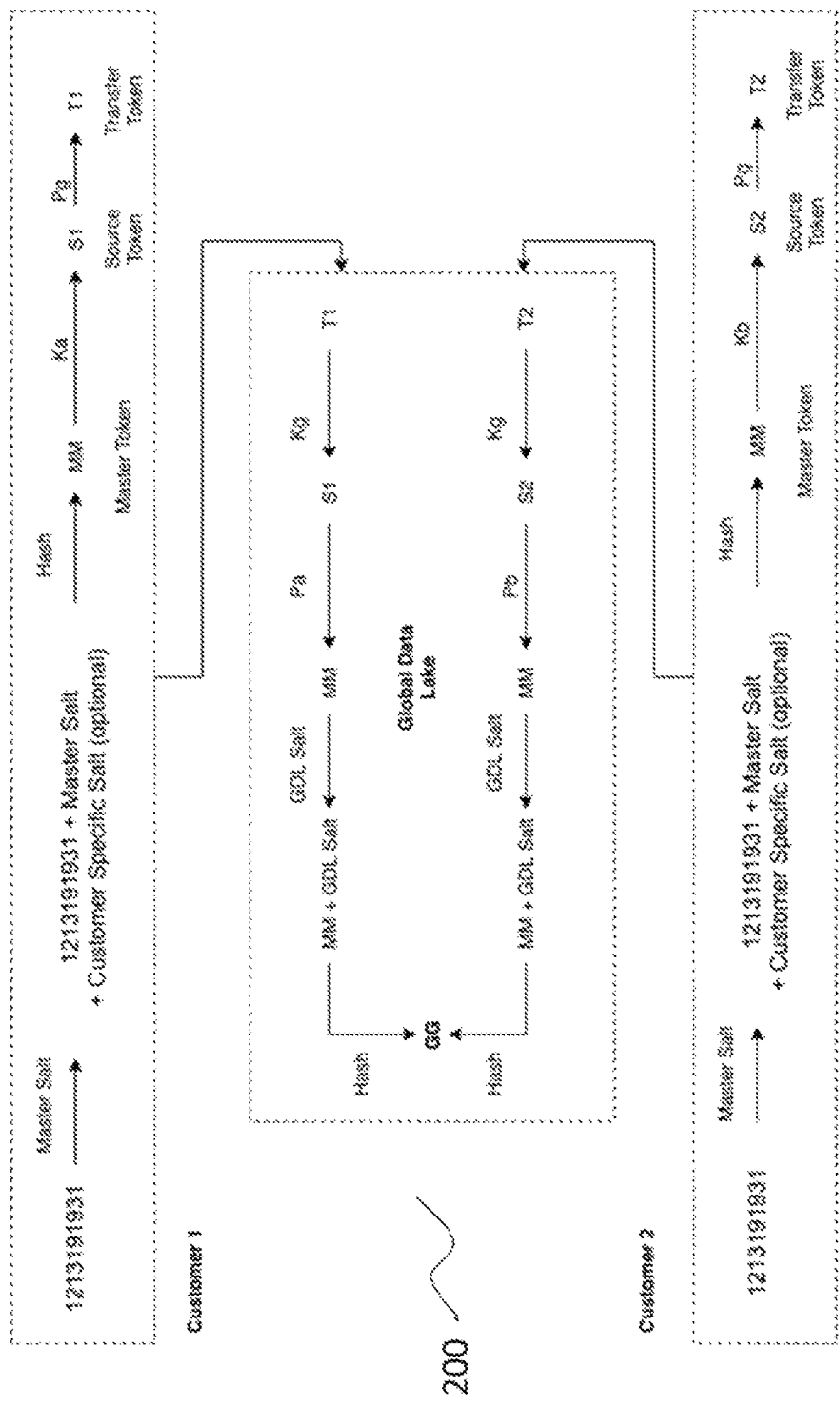
FIG. 2 illustrates a process flow for generating various tokens by the system architecture, according to an exemplary embodiment of the present subject matter.

FIG. 2 illustrates process flow 200 for generating various tokens by the system architecture, according to an exemplary embodiment of the present subject matter. With reference to FIGS. 1-2, the source data environment 114 includes the at least one source storage unit 104 and the at least one source processing unit 106. The at least one source storage unit 104 stores plurality of customer data and associated identifiers. The plurality of customer data is accessed, via the one or more source storage units 104 over the communication network. The source processing unit 106 is connected to the one or more source storage units 104 to access the plurality of customer data. The source server 102 includes the first key management unit to provide source hardware salt for hash functions and primary and secondary encryption keys. The source processing unit 106 is configured to de-identify the plurality of customer data based on a master salt to generate a master token. The master token is a primary token or a master token used for de-identifying the customer data received from multiple sources or the source environments. At the source data environment 114, the universal identifiers of multiple customer data are de-identified by hashing universal attributes using the master salt. Thus, the master token is generated at the source data environment 114.

As shown in the Figure, for a first customer data 'Customer 1' having an associated identifier '12131919131', the master token (MM) is encrypted using a source-encryption key (Ka) to generate a source token (S1). The source token is a site token. The source token (S1) or the site token is encrypted using a target-encryption key (Pg) to generate a transfer token or a transfer token (T1). An authorized access of the transfer token (T1) via a secured channel at the central storage unit 108, also termed as global data lake. The central processing unit 112 is connected in communication to the central storage unit 108 and the central server 110. The central server 110 includes the second key management unit to provide target hardware salt for hash functions and primary and secondary decryption keys. Thus, each server, whether at customer level or at the central environment, will have their own key management units. The central processing unit 112 is configured for decrypting the transfer token (T1) using a target decryption key (Kg) to obtain the source token (S1). The source token (S1) is decrypted using a source decryption key (Pa) to obtain the master token (MM). The master token (MM) is hashed with a target salt (also termed as Global Data Lake Salt or GDL Salt) to generate a global identifier (GG).

Similarly, for second customer data 'Customer Data 2', which is having the same identifier '12131919131', de-identification process is carried at the source data environment 114. The source processing unit 106 encrypts the master token (MM) is using a source-encryption key (Kb) to generate a source token (S2). The source token (S2) is encrypted using a target-encryption key (Pg) to generate a transfer token (T2). An authorized access of the transfer token (T2) via a secured channel at the central storage unit 108 or the global data lake. The central processing unit 112 is configured for decrypting the transfer token (T2) using a target decryption key (Kg) to obtain the source token (S2). The source token (S2) is decrypted using a source decryption key (Pb) to obtain the master token (MM). The master token (MM) is hashed with a target salt (GDL Salt) to generate the global identifier (GG).

Once the global identifier (GG) is generated, the plurality of de-identified customer data can be linked or unified by using the global identifier. According to the embodiments of the present subject matter, Ka, Kb, Pa, and Pb are the second-specific keys. Kg and Pg are global data lake keys. K denotes private key and remains in its environment. P denotes public key and can be shared with authorised environments. Each customer uses their own private keys. The master salt is a random generated code and is a single universal common salt that is deployed with de-identification service. GDL salt is kept in global data lake environment and also not present in the central storage. GDL salt is used in the central environment and is kept in the central environment in the key management unit. Key management unit is different from central storage, which stores the de-identified data. Further, the outputs of the intermediate steps are not persisted or stored. Only the final output (i.e., transfer token in case of customers and the global identifier in case of global data lake) is persisted in any form and stored.

The source token ensures that only authorized entities with whom the decryption key has been shared by the customer, are allowed to link the de-identified data. The transfer token ensures that the data intended for a target location can only be linked in the target location. For example, in a scenario, Party A agreed with Party B and Party E to share its de-identified data. Party E's agreement expires while Party B's still stays in force. Party E is not getting any new data from A. However, if Party E somehow manages to get Party A's data while it is getting transmitted to Party B, then it would not be able to link it with the source. The transfer token thus facilitates in providing security in data transitions.

According to the embodiments of the present subject matter, the master salt generates same master token at the one or more source storage units 104 for any of the corresponding identifiers. The master salt and the target salt are randomly generated multi-digit alphanumeric codes. Further, the source-encryption key is a private key to encrypt the master token and the target encryption key is a public key to encrypt the source token. As described above, the source token is used by an authorized user or entity to link respective customer data by accessing the source decryption key.

Figure 3:
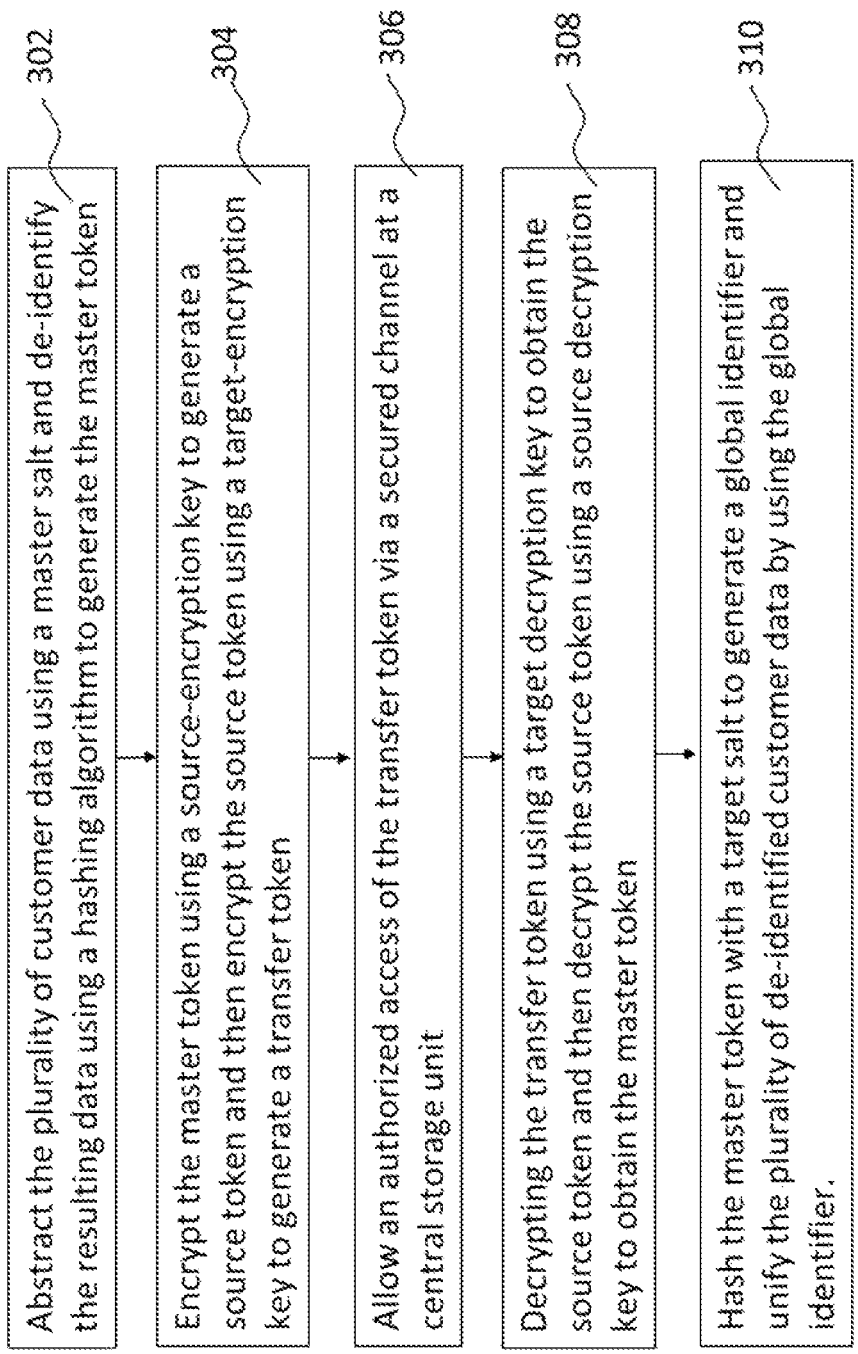
FIG. 3 illustrates a method for providing global identifiers, according to an exemplary embodiment of the present subject matter.

FIG. 3 illustrates a method for unifying the plurality of de-identified customer data from one or more source storage units 104, according to an exemplary embodiment of the present subject matter.

At step 302, the plurality of customer data is abstracted using a master salt and the resulting data is de-identified using a hashing algorithm to generate the master token. The plurality of customer data is de-identified based on a master salt to generate a master token. One or more source storage units 104 may store the plurality of customer data. The plurality of customer data may be accessed via the one or more source storage units 104 over the communication network. The master salt generates same master token at the one or more source storage units 104 for any of the corresponding identifiers. The master salt is a randomly generated multi-digit alphanumeric code.

At step 304, the master token is encrypted by using a source-encryption key to generate a source token at the source environment. The source environment includes the source processing unit 106 in communication to the one or more source storage units 104 and the source server 102 that provides a key management unit to encrypt the data at the source data environment 114. The source processing unit 106 is configured for encrypting the master token and the source token. Encryption of the source token takes place at the source data environment 114 by using a target-encryption key to generate the transfer token.

At step 304, an authorized access of the transfer token is allowed via a secured channel at a central storage unit 108 to merge all the de-identified customer data at one place, i.e., into the central storage unit 108. The central processing unit 112 is configured to decrypting the transfer token at the central data environment 116 or the global data lake.

At step 306, the transit key is decrypted by using a target decryption key to obtain the source token. Thereafter, the source token is decrypted using a source decryption key to obtain the master token.

At step 306, the master token is hashed with a target salt to generate a global identifier. The global identifier is then used to unify the plurality of de-identified customer data at the central data environment 116. The target salt is a randomly generated multi-digit alphanumeric code.

Figure 4:
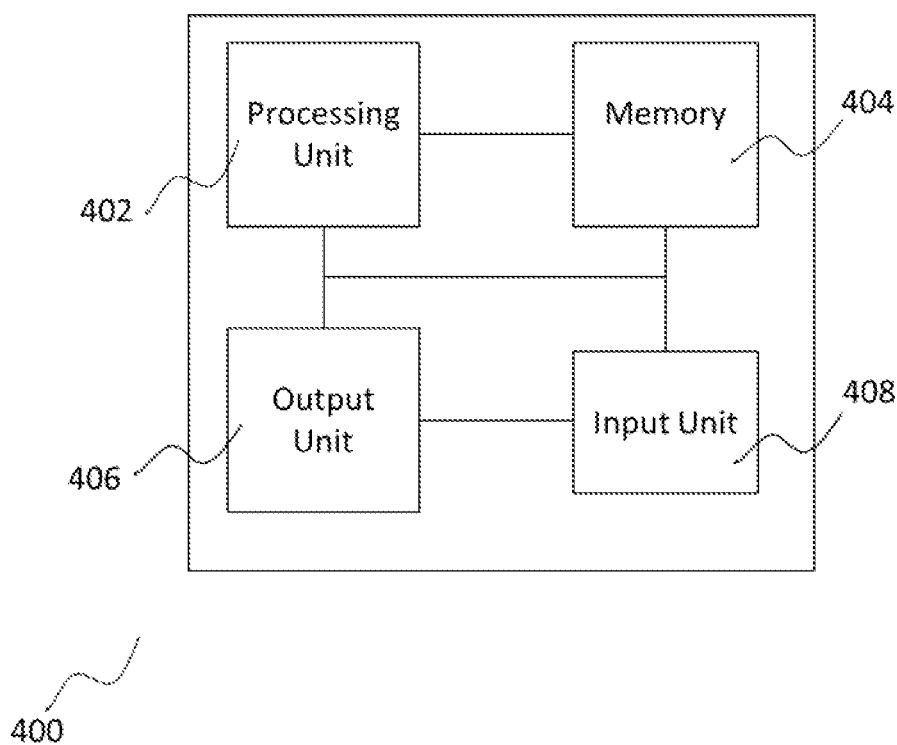
FIG. 4 illustrates a computer environment according to an exemplary embodiment of the present subject matter.

FIG. 4 illustrates computer environment according to an embodiment of the present subject matter. The system is implemented in a computer environment 400 comprising a processor unit connected to a memory 404. The computer environment may have additional components including one or more communication channels one or more input devices, and one or more output devices. The processor unit executes program instructions and may include a computer processor, a microprocessor, a micro-controller, and other devices or arrangements of devices that are capable of implementing the steps that constitute the method of the present subject matter. The memory 404 stores an operating system, program instructions, data transaction information, metadata for implementing the system and the method according to the present subject matter. The memory 404 also participates in providing an environment for operation of the de-identification and linking process steps in a non-volatile storage medium.

The input unit 408 may include, but not limited to, a keyboard, mouse, pen, a voice input device, a scanning device, or any another device that is capable of providing input to the computer system. In an embodiment of the present subject matter, the input unit 408 may be a sound card or similar device that accepts audio input in analog or digital form. The output unit 406 may include, but not limited to, a user interface on CRT or LCD screen, printer, speaker, CD/DVD writer, or any other device that provides output from the computer system.

It will be understood by those skilled in the art that the figures are only a representation of the structural components and process steps that are deployed to provide an environment for the solution of the present subject matter discussed above and does not constitute any limitation. The specific components and method steps may include various other combinations and arrangements than those shown in the figures.

The term exemplary is used herein to mean serving as an example. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What claimed is:

1. A method for unifying a plurality of de-identified customer data from one or more source storage units, the method comprising:
    accessing, via the one or more source storage units over a communication network, a plurality of customer data;
    configuring a source processing unit, the source processing unit being in communication to the one or more source storage units and a source server, the source processing unit configured for:
        de-identifying the plurality of customer data based on a master salt to generate a master token;
        encrypting the master token using a source-encryption key to generate a source token;
        encrypting the source token using a target-encryption key to generate a transfer token; and
        allowing an authorized access of the transfer token via a secured channel at a central storage unit; and
    configuring a central processing unit, the central processing unit being in communication to the central storage unit and a central server, the central processing unit configured for:
        decrypting the transfer token using a target decryption key to obtain the source token;
        decrypting the source token using a source decryption key to obtain the master token;
        hashing the master token with a target salt to generate a global identifier; and
        unifying the plurality of de-identified customer data by using the global identifier.

2. The method as claimed in claim 1, wherein each of the plurality of customer data is associated with a corresponding identifier containing person identity information (PII) and non-PII information of respective customers.

3. The method as claimed in claim 2, wherein the master salt generates same master token at the one or more source storage units for any of the corresponding identifiers.

4. The method as claimed in claim 1, wherein the master salt is a randomly generated multi-digit alphanumeric code.

5. The method as claimed in claim 1, wherein the target salt is a randomly generated multi-digit alphanumeric code.

6. The method as claimed in claim 1, wherein the source-encryption key is a private key to encrypt the master token.

7. The method as claimed in claim 1, wherein the target encryption key is a public key to encrypt the source token.

8. The method as claimed in claim 1, wherein the source token is used by an authorized user to link respective customer data by accessing the source decryption key.

9. A system for unifying a plurality of de-identified customer data from one or more source storage units, the system comprising:
   one or more source storage units 104 storing a plurality of customer data;
   a source processing unit connected in communication to the one or more source storage units and a source server in a communication network, the source processing unit configured for:
      de-identifying the plurality of customer data based on a master salt to generate a master token;
      encrypting the master token using a source-encryption key to generate a source token;
      encrypting the source token using a target-encryption key to generate a transfer token; and
      allowing an authorized access of the transfer token via a secured channel at a central storage unit; and
   a central processing unit connected in communication to the central storage unit and a central server in the communication network, the central processing unit is configured for:
      decrypting the transfer token using a target decryption key to obtain the source token;
      decrypting the source token using a source decryption key to obtain the master token;
      hashing the master token with a target salt to generate a global identifier; and
      unifying the plurality of de-identified customer data by using the global identifier.

10. The system as claimed in claim 9, wherein each of the plurality of customer data is associated with a corresponding identifier containing person identity information (PII) and non-PII information of respective customers.

11. The system as claimed in claim 10, wherein the master salt generates same master token at the one or more source storage units for any of the corresponding identifiers.

12. The system as claimed in claim 1, wherein the master salt is a randomly generated multi-digit alphanumeric code.

13. The system as claimed in claim 1, wherein the target salt is a randomly generated multi-digit alphanumeric code.

14. The system as claimed in claim 1, wherein the source-encryption key is a private key to encrypt the master token.

15. The system as claimed in claim 1, wherein the target encryption key is a public key to encrypt the source token.

16. The system as claimed in claim 1, wherein the source token is used by an authorized user to link respective customer data by accessing the source decryption key.

* * * * *